United States Patent [19]

Moeller

[11] 4,221,348
[45] Sep. 9, 1980

[54] BELT DRIVEN TAPE CARTRIDGE

[75] Inventor: Gary D. Moeller, Maplewood, Minn.

[73] Assignee: Minnesota Mining and Manufacturing Company, Saint Paul, Minn.

[21] Appl. No.: 27,785

[22] Filed: Apr. 6, 1979

[51] Int. Cl.³ .................... G03B 1/04; G11B 15/32
[52] U.S. Cl. ................................. 242/192; 242/199
[58] Field of Search .............. 242/192, 198, 199, 200, 242/76

[56] References Cited

U.S. PATENT DOCUMENTS

| | | | |
|---|---|---|---|
| 3,861,619 | 1/1975 | Wolff | 242/188 |
| 4,004,752 | 1/1977 | Kamaya | 242/188 |

Primary Examiner—Leonard D. Christian
Attorney, Agent, or Firm—Cruzan Alexander; Donald M. Sell; Terryl K. Qualey

[57] ABSTRACT

A two-reel tape cartridge in which an elastic belt extends around guide rollers adjacent the reels and a driving roller between the reels and contacts the tape on the reel hubs. The tape path between the reels is spaced from the drive belt and extends across a cutaway portion along one edge of the cartridge for access by a transducer. Tape wrap pins in the tape path adjacent each reel make less contact with the tape as more of the tape is transferred from the adjacent reel serving to make the tape tension at the transducer quite uniform as the tape is transferred from one reel to the other.

4 Claims, 3 Drawing Figures

U.S. Patent  Sep. 9, 1980  4,221,348
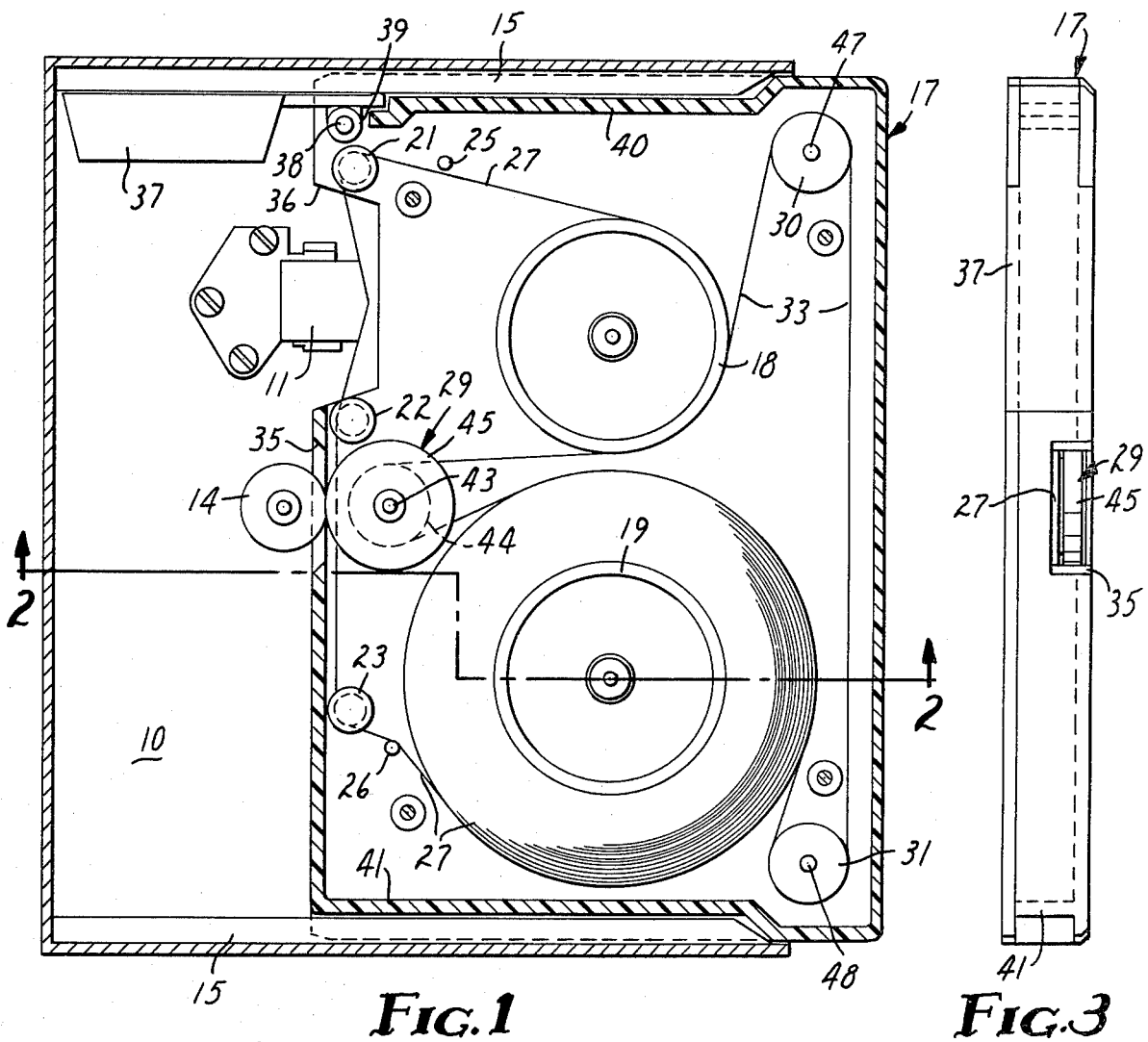
FIG. 1  FIG. 3
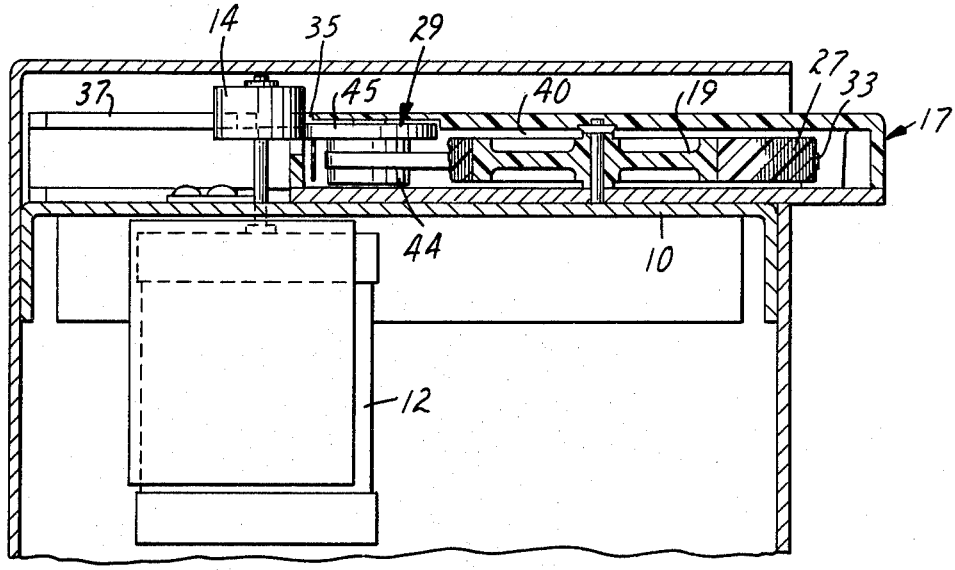
FIG. 2

BELT DRIVEN TAPE CARTRIDGE

FIELD OF THE INVENTION

The present invention relates to a two-reel tape cartridge in which a flexible, elastic drive belt contacts the tape on the reel hubs whereby movement of the belt causes movement of the tape between the reels.

BACKGROUND OF THE INVENTION

The belt driven tape cartridge of U.S. Pat. No. 3,692,255 has been very successfully utilized to interface with computers where rapid acceleration and deceleration of the tape are required. However, because the drive belt has a finite thickness, when the supply reel has a small amount of tape the belt must pass through a sharper radius and thus produces a larger tension in the tape than when the supply reel has a greater amount of tape. Also, when the tape supply is small the angle of wrap around the adjacent tape guide is larger which creates a larger tape tension than when the supply is large and the wrap around the guide is thus smaller. These two effects are additive and make the tape tension at the transducer nonuniform as the tape is transferred between the reels. This is undesirable because a certain minimum tape tension is desired to maintain good contact with the transducer but a greater tape tension is undesirable since it increases the wear on the transducer.

SUMMARY OF THE INVENTION

In the two-reel tape cartridge of the present invention, an elastic drive belt extends along a belt guide path around guide members positioned adjacent the reels and a driving roller positioned between the reels and contacts the tape on the reel hubs. A tape path extends between the reel hubs and along one edge of the cartridge across a cutaway portion for access to the tape by a transducer. A length of tape extends along the tape path and is wound on the reel hubs in opposite directions about their axes. The tape path is defined by a pair of tape guides and a pair of tape wrap pins, one guide and one pin being positioned on each side of the cutaway portion of the cartridge. A tape wrap pin is positioned between each reel hub and the adjacent tape guide to deflect the tape from a straight line path between the tape supply on the reel hub and the tape guide when a portion of the length of tape is wound on the reel hub and to increase the deflection as the amount of tape wound on the hub is increased. The extent of wrap of the tape around a tape wrap pin and thus the frictional coupling between the tape and the pin is decreased as the amount of tape wound on the adjacent reel hub is decreased thereby tending to maintain the tape tension constant at a transducer contacting the tape at the cutaway portion of the cartridge as the length of tape is transferred from one reel hub to the other.

THE DRAWING

In the Drawing:

FIG. 1 is a top view of a belt driven tape cartridge constructed in accordance with the present invention partially in section and in position on a recording and/or reproducing machine;

FIG. 2 is a cross-sectional view taken along line 2—2 of FIG. 1; and

FIG. 3 is an edge view of the cartridge of FIG. 1.

In FIGS. 1 and 2 the cartridge is shown in position in a recording and/or reproducing machine, hereinafter referred to as a tape recorder. The tape recorder comprises a support frame including a horizontal cartridge support deck 10 supporting a magnetic transducer 11 and in a depending manner supporting a reversible drive motor 12, the shaft of which extends through and carries a drive roller 14 above the support deck 10. Elongate guides 15 define a position for the cartridge on the cartridge support deck 10.

The cartridge includes a shell 17 defining a thin, generally rectangular enclosure. Enclosed within the cartridge shell 17 are a pair of reel hubs 18 and 19, three tape guides 21, 22 and 23, a pair of tape wrap pins 25 and 26, a length of tape 27, a belt driving roller 29, a pair of belt guide rollers 30 and 31 and a driving belt 33.

The cartridge shell 17 is formed with an opening 35 in its top wall and extending into one edge wall centrally of the length of the edge wall to provide access for the drive roller 14 of the tape recorder. The same edge wall of the cartridge is also formed with a cutaway portion 36 for access to the magnetic tape 27 by the magnetic transducer 11. The cutaway portion 36 is normally covered by a door 37 which is pivoted on a stud 38 adjacent the corner of the cartridge and biased by a torsion spring 39 toward its closed position covering the cutaway portion 36. The opposed edge walls 40 and 41 of the cartridge shell 17, which are perpendicular to the edge wall thereof containing the cutaway portion 36, are recessed along a majority of their length to expose the base wall of the cartridge shell 17 and the elongate guides 15 in the recorder are formed to fit over the exposed portions of the base wall to guide the cartridge as it is inserted into the recorder. The door 37 of the cartridge shell 17 extends beyond its pivot stud 38 into the recessed portion of the adjacent edge wall 40 and the leading edge of the corresponding cartridge guide 15 in the tape recorder is beveled to pivot the door 37 to an open position against the bias of the torsion spring 39 as the cartridge is inserted into the machine.

The reel hubs 18 and 19 supported by the cartridge shell 17 for free rotation about spaced parallel axes. The tape 27 is convolutely wound on the reel hubs in opposite directions about their axes. A tape guide path between the reel hubs is defined by the three guide pins 21, 22 and 23 and the pair of tape wrap pins 25 and 26. One tape guide pin 21 is positioned to one side of the cartridge cutaway portion 36 and the other two tape guide pins 22 and 23 are positioned along the edge wall of the cartridge on the opposite side of the cutaway portion 36. One tape wrap pin 25 is positioned between the reel hub 18 and the adjacent tape guide 21 and the other tape wrap pin 26 is positioned between the reel hub 19 and the adjacent tape guide 23.

Each tape wrap pin is positioned to deflect the tape from a straight line path between the tape supply on the heel hub and the adjacent tape guide when a portion of the length of tape is wound on the reel hub and to increase the deflection as the amount of tape wound on the hub is increased. Thus, in FIG. 1 the maximum amount of tape is wound on the reel hub 19 and the tape wrap pin 26 provides a maximum deflection of the tape path between the tape supply on reel hub 19 and the adjacent tape guide 23. The minimum tape supply is shown in FIG. 1 on reel hub 18 and, in the illustrated embodiment, the tape 27 does not contact the tape wrap pin 25. As tape is transferred from reel hub 19 to reel hub 18 and a portion of the length of tape is wound on reel hub 18, the tape will begin to contact tape wrap pin 25 and thereafter as tape is wound on reel hub 18 the tape path will be deflected by tape wrap pin 25 with the deflection increasing as the amount of tape wound on the hub 18 is increased.

The extent of tape wrap around a tape wrap pin 25 or 26 is thus decreased as the amount of tape on the adjacent reel hub 18 or 19 is decreased. Decrease of the tape wrap decreases the frictional coupling between the tape and the pin thereby tending to decrease the tape tension at the transducer 11. The tape wrap pins 25 and 26 also maintain the tape wrap around the adjacent tape guides 21 and 23 generally constant as the length of tape is transferred from one reel hub to the other. Thus, the tape tension due to the fricton between the tape 27 and the tape guides 21 and 23 will be maintained generally constant while the decreasing wrap of the tape on the tape wrap pin 25 or 26 with decreasing tape on the hub 18 or 19 acting as the supply reel counterbalances the tendency for there to be a minimum tension when the supply is largest and a maximum tension when the supply is smallest. In this manner the tape tension can be made fairly constant throughout the tape travel.

The belt driving roller 29 is supported for free rotation on a shaft 43 with its axis parallel to the axes of the reels 18 and 19 and positioned on the center line of the cartridge between the reel hubs. The belt driving roller 29 is formed with a smaller diameter portion 44 which is crowned in horizontal alignment with the center line of the tape guide path, and a larger diameter portion 45 extending into the drive roller opening 35 in the cartridge shell 17. The larger diameter portion 45 extends over the tape path between the guide pins 22 and 23 to permit driving of the belt driving roller 29 by the drive roller 14 in the recorder without contacting the tape 27.

The belt guide rollers 30 and 31 are supported on the cartridge shell 17 by stationary shafts 47 and 48, respectively, for rotation about axes parallel to the axis of the belt driving roller 29. The belt guide rollers 30 and 31 are constructed of materials which have a predetermined coefficient of friction to provide a predetermined frictional coupling between each guide roller and its support shaft for a purpose which will be hereinafter described. The belt guide rollers are positioned at opposite corners of the cartridge shell 17 along the edge wall thereof parallel to the edge wall formed with the cut-away portion 36. Each belt guide roller is centrally crowned in horizontal alignment with the crowning on the smaller diameter portion 44 of the belt driving roller 29. The belt driving roller 29 and the belt guide rollers 30 and 31 define a belt guide path having an angle of wrap of at least 60° at the periphery of the reel hubs 18 and 19.

The drive belt 33 is thin, continuous, flexible and elastic. It has a uniform cross-sectional area and it extends along the belt path around the belt driving roller 29 and the belt guide rollers 30 and 31, contacting the tape 27 on the reel hubs 18 and 19. It has a coefficient of elasticity in the range from 0.01 to 0.25 meters/newton-meter.

The length of the belt 33 is less than the length of the belt guide path so that when the belt is stretched into position along the guide path it will have an as installed tension or pretension of at least 1.6 newtons. The angle of wrap of the belt guide path at the reel hubs of at least 60° provides the necessary contact between the belt and the tape wound on the reel hubs to assure frictional driving of the tape 27 and driving of the reel hubs 18 and 19 by the belt 33. The pretension in the belt provides the frictional engagement force between the belt guide rollers 30 and 31 and their respective support shafts 47 and 48, it provides the frictional engagement force between the belt and the tape and it presses the tape layers together to prevent slippage between the tape layers on the reel hubs 18 and 19. The belt pretension must be adequate to permit rapid acceleration and deceleration of the tape without slippage. The belt is preferably chosen of a material having a coefficient of friction against the tape greater than between the layers of tape so that any slippage will first occur between the layers of tape. Nearly any material of which the belt may be constructed will fulfill this criteria. Below a pretension of 1.6 newtons rapid deceleration may cause slippage between the layers of the tape on the reel hubs and spilling of tape from the supply reel. As the pretension increases the power required to drive the belt increases and it is preferable that the pretension be below 7 newtons so that the driving power requirement will remain low.

Rotation of the belt driving roller 29 in a counter-clockwise direction (as viewed in FIG. 1) by the drive roller 14 causes the belt to traverse its drive path in a counterclockwise direction and the tape 27 to move from the reel hub 19 to the reel hub 18, the reel hub 19 serving as a supply reel and the reel hub 18 serving as a take-up reel. The predetermined frictional coupling between the belt guide rollers 30 and 31 and their respective support shafts 47 and 48 applies a predetermined drag to the belt as it passes around the guide rollers, thereby increasing the tension of the belt as it passes around each of the guiderollers. This increased tension in the belt 33 increases the length of the belt according to the elasticity of the belt, and thereby the speed at which the belt passes around the take-up reel 18 over that at which it passes around the supply reel 19. This increased speed causes tension in the tape 27 as well as the ability to take up any slack developed in the tape between the reel hubs as more fully taught in U.S. Pat. No. 3,692,255.

One specific embodiment of the present invention, utilizing approximately 91.4 meters of 0.003 centimeter thick and 0.63 centimeter wide magnetic recording tape having a polyester backing, was constructed as illustrated in FIGS. 1 through 3 for use in conjunction with digital computers. The cartridge had 4 centimeter diameter reel hubs 18 and 19, the belt 33 was polyurethane having a thickness of 0.014 centimeter and a coefficient of elasticity of 0.018 meter/newton-meter. The pretension in the belt was set at 4.4 newtons and the belt guide rollers 30 and 31 and their support shafts 47 and 48 were constructed to develop a friction force of 0.14 newton at each guide roller.

The tape guide pins 21, 22 and 23 were constructed of stainless steel and had a diameter of 0.533 centimeter and the tape wrap pins 25 and 26 were of hardened steel with a diameter of 0.239 centimeter. The coefficient of friction between the tape 27 and the guide pins 21, 22 and 23 and between the tape and the tape wrap pins 25 and 26 was 0.2. The diameter of the full supply reel, as illustrated on the hub 19 in FIG. 1, was 7.04 centimeters.

When the tape hub 18 was empty (as illustrated in FIG. 1) the tape 27 did not contact the tape wrap pin 25 and the angle of wrap at guide pin 21 was 104°. When the tape was fully transferred to reel hub 18 the angle of wrap at wrap pin 25 was 21° and the angle of wrap at guide pin 21 was 98°. The variation of 6° in the angle of wrap at guide pin 21 is substantially constant within the scope of the present invention.

With the reel hub 19 full (as illustrated in FIG. 1) the angle of wrap at wrap pin 26 was 35° and at guide pin 23 it was 80°. When reel hub 19 was empty the angle of wrap at wrap pin 26 was 0° (i.e. it was just tangent) and the angle of wrap at guide pin 23 remained at 80°.

The tape tension at the transducer 11 was measured for the cartridge constructed as described above and compared to a similar cartridge constructed without the tape wrap pins 25 and 26. The tape tension was measured by replacing the magnetic transducer 11 with a strain transducer. Without the tape wrap pins 25 and 26, when the reel hub 19 was the supply the tape tension started at 0.322 newton when the reel was full and increased generally linearly to 0.734 newton when the reel was empty. Upon reversal of the tape travel (with reel hub 18 becoming the supply) the tape tension began at 0.373 newton and increased generally linearly to 0.873 newton.

The cartridge constructed with the tape wrap pins 25 and 26 had an initial tape tension with reel hub 19 as the full supply of 0.514 newton which increased to 0.673 newton when reel hub 19 was empty. Upon reversal of the tape (with reel hub 18 acting as the supply) the tape tension initially was 0.487 newton and it rose to 0.712 newton when reel hub 18 was empty. This cartridge thus had a much more uniform tape tension throughout the entire range of tape travel than the cartridge without the tape wrap pins. The variation between the maximum and minimum tape tension was less than 0.25 newton which is highly desirable.

I claim:

1. In a tape cartridge having a pair of reel hubs on spaced parallel axes, a tape path extending between the reel hubs and along one edge of the cartridge across a cutaway portion in the cartridge edge wall for access by a transducer, the tape path being defined by a pair of tape guides, one on each side of said cutaway portion, a length of tape extending along the tape path and wound on the reel hubs in opposite directions about their axes, a drive belt guide path defined by a belt driving roller and a pair of belt guide members, the belt guide path being spaced from the tape path and passing between the reel hubs from the belt driving roller to each of the belt guide members, and an elastic drive belt extending along the belt guide path and contacting the tape on the reel hubs, the improvement comprising:

a pair of tape wrap pins defining the tape guide path with the tape guides, one tape wrap pin being positioned between each reel hub and the adjacent tape guide, each tape wrap pin being positioned to deflect the tape from a straight line path between the tape supply on the reel hub and the tape guide when a portion of the length of tape is wound on the reel hub and to increase the deflection as the amount of tape wound on the hub is increased, whereby the extent of wrap of the tape around a tape wrap pin and thus the frictional coupling between the tape and the pin is decreased as the amount of tape wound on the adjacent reel hub is decreased thereby tending to maintain the tape tension constant at a transducer contacting the tape in the cutaway portion of the cartridge as the length of tape is transferred from one reel hub to the other.

2. The tape cartridge of claim 1 wherein the tape guides and the tape wrap pins are stationary and have a coefficient of friction with the tape of about 0.2.

3. The tape cartridge of claim 1 wherein the variation in the tape tension as the tape is transferred between the reel hubs is less than about 0.25 newton.

4. The tape cartridge of claim 1 wherein the angle of wrap around the tape guides is maintained generally constant as the tape is transferred between the reel hubs.

* * * * *